Figure 1:
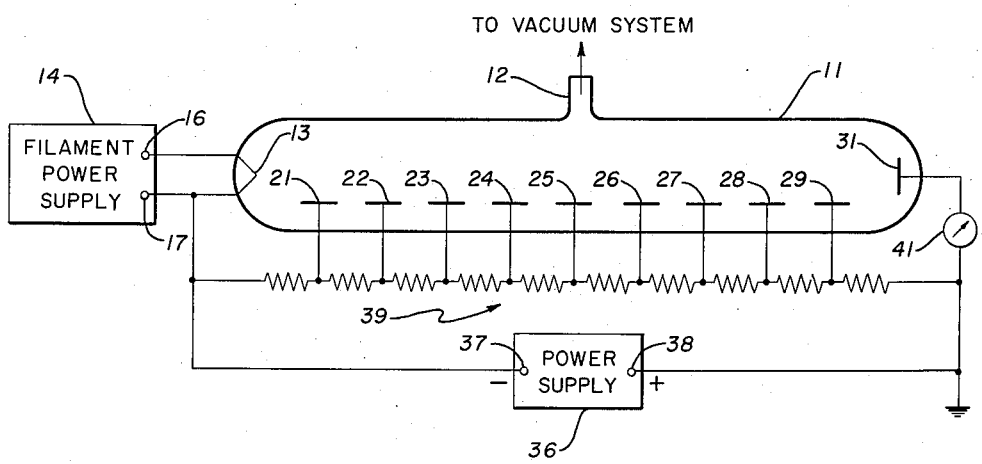

INVENTOR.
WILLIAM P. BALL

United States Patent Office 2,966,799
Patented Jan. 3, 1961

2,966,799

SENSITIVE PRESSURE GAUGE

William Paul Ball, Livermore, Calif., assignor to the United States of America as represented by the United States Atomic Energy Commission Filed May 17, 1956, Ser. No. 585,586

6 Claims. (Cl. 73—398)

The present invention relates to a sensitive pressure gauge and more particularly to an electrical pressure sensitive device.

Many types of pressure gauges are known in the art and among the more sensitive of the referenced types are the ionization gauges. Such ionization gauges have been developed utilizing triode or tetrode type electron tubes with the envelope communicating with the vessel or apparatus of which the pressure is to be measured. Usually, operating potentials are connected to the tube elements to establish an electron stream between the cathode and grids and to establish a negative potential on the anode. In operation, electrons collide with gas molecules or particles and result in the formation of ions which are attracted to and collected by the anode. Measurement of the ion current in the anode circuit provides a proportional indication of the pressure. From the foregoing brief description of the ionization gauge, it is readily apparent that at low pressures the number of gas molecules is low and that the ion current is therefore minimized. With very low values of ion current to measure, it has been found that the accuracy of measuring the ion current as an indication of pressure is not as satisfactory as required in present day applications.

To overcome the inherent limitations and disadvantages as set forth above, the present invention provides an ionizing electron stream which is directed to impinge upon a secondary emissive electrode. With the electron stream traversing an absolute vacuum along the path to the secondary emissive electrode, a maximum number of secondary electrons are produced which is a multiplied number over that of the original stream of electrons. When gas particles are present in the path of the electron stream, some of the electrons lose energy by collisions with such particles and by other energy-reducing phenomena so that the number of secondary electrons produced at the electrode is decreased. Thus, it is readily apparent that, by suitable calibration of a current measuring device which indicates current due to the secondary electrons, a measurement of pressure is obtained. Since the current due to the secondary electrons is a multiplied quantity over the current of the original electron stream, the effect of the gas particles is amplified to provide a more sensitive pressure indication than the ionization gauge. By providing a plurality of secondary emissive electrodes, the sensitivity of the present invention is further increased and, also, the ability to measure pressures approaching an absolute vacuum.

It is therefore an object of the present invention to provide a new and improved pressure gauge.

Another object of the invention is to provide a pressure gauge wherein the sensitivity is inherently increased over previously known types of gauges.

Still another object of the invention is to provide a pressure gauge utilizing secondary emission.

A further object of the present invention is to provide an electron multiplication device sensitive to any process occurring therein which alters the energy of electrons traversing paths between elements.

A still further object of the invention is to provide a more accurate and sensitive electronic pressure and temperature responsive indicator.

Figure 2:
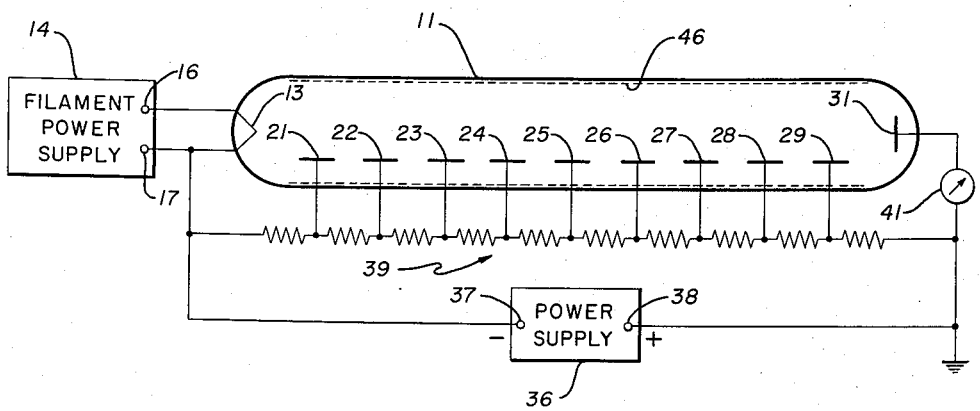

Other objects and advantages of the invention will be apparent from the following description and claims considered together with the accompanying drawing, in which:

Figure 1 is a schematic wiring diagram of the invention for indicating pressure; and Figure 2 is a schematic wiring diagram of the invention for indicating temperature.

Referring to the drawing in detail, Fig. 1 in particular, there is provided an air-tight envelope 11 having a communicating opening 12 for connection to a vacuum system, or the like, of which the pressure is to be measured. An electron emissive cathode 13 is disposed within the envelope 11. Such cathode 13 is of the heated filamentary type, as illustrated in the drawing, or a photo-emissive type with an associated light source to provide a continuous stream of free electrons. For the filamentary cathode 13 there is provided a conventional filament power supply 14 having output terminals 16, 17 suitably connected to the cathode.

Also disposed within the envelope 11 are a plurality of secondary emissive electrodes, 21 to 29, inclusive, known as dynodes. Such dynodes, 21 to 29, are mounted to intercept, in succession, the electron stream originating at the cathode 13. To receive the electron stream, as multiplied, from the final dynode 29 there is provided an anode 31.

A conventional power supply 36 having a negative output terminal 37 and a positive output terminal 38 is provided with a resistive voltage divider 39 connected between the terminals. The voltage divider 39 has a plurality of taps with equal values of resistance between successive taps and such taps are connected, respectively, to the dynodes 21 to 29. The negative terminal 37 of the power supply 36 is connected to the cathode 13 and the positive terminal 38 is connected to ground and to the anode 31 through a current measuring device 41. Such connections then provide suitable operating potentials upon the various electrodes disposed within the envelope 11.

Consider the operation of the present invention, as described above, with the power supplies 14, 36 suitably energized, but with the opening 12 sealed and the envelope 11 suitably evacuated. Under such conditions electrons emitted by the cathode 13 are attracted to the first dynode 21 because of the applied operating potential from the voltage divider 39. When the electrons strike the first dynode 21, secondary electrons are emitted and the number of secondary electrons is a multiplication of the number of electrons striking the dynode. The secondary electrons emitted at the first dynode 21 are then attracted by the more positive potential of the succeeding dynode 22 where the emission of a greater number of secondary electrons occurs. The foregoing action is repeated at each of the succeeding dynodes 23 to 29 and the highly multiplied secondary electrons of the final dynode are collected by the anode 31. The resulting flow of current at the anode 31 is then indicated by the current measuring device 41.

Consider, now, the operation of the invention under similar conditions, but with the seal removed from the opening 12 and a communicating connection made between a system to be measured for pressure and the envelope 11 at the opening. Gas particles are thus introduced into the envelope 11 and into the path of the electron stream where collisions between the particles and electrons occur. Those electrons which collide with gas particles are reduced in energy and such action results in a decrease in the number of secondary electrons at the dynodes 21—29. It is apparent that the number of collisions occurring in the envelope 11 is a function of the number of gas particles and, in turn, that the number of gas particles is a function of the pressure. Thus, the current reading of the meter or current measuring device 41 is an indication of the pressure within the envelope 11 and, since the envelope is connected to a system to be measured for pressure, also the pressure of such system.

It is to be noted that the measurable effect of gas pressure within the envelope 11 as indicated by the device 41 is substantially $A^n$, where $n$ is the number of dynodes and A is the measurable effect of gas pressure with existing types of pressure gauges.

As a temperature indicating device (see Fig. 2) a solid or liquid substance having a suitable vapor pressure versus temperature characteristic, such as liquid mercury, solid cesium, etc., is inserted into the envelope 11 as by a coating 46 on the interior surface and the envelope is sealed. A change in the temperature of the envelope 11 causes a change in the temperature of the temperature sensitive substance and alters the density of the vapor within the envelope. The resulting effect and operation of the device is the same as previously described with the exception that the change in density of the electron impeding atmosphere in the envelope 11 is caused by a change in temperature rather than to a density change effected by a pressure change in an external system. The current measuring device 41 is readily calibrated in terms of temperature.

Such temperature indicating device is rendered extremely accurate to very small temperature changes by the fact that small changes in temperature result in large changes in vapor pressure of the temperature-sensitive substances mentioned above. The foregoing is in addition to the accuracy and sensitivity provided by the electron multiplication previously described.

While the salient features of the present invention have been described in detail with respect to two embodiments, it will be apparent that numerous modifications may be made within the spirit and scope of the invention and it is therefore not desired to limit the invention to the exact details shown except insofar as they may be defined in the following claims.

What is claimed is:

1. In a method of measuring pressure, the steps comprising developing a stream of electrons having a path through an atmosphere to be measured for pressure, multiplying the number of electrons of said stream in inverse relation to the pressure of said atmosphere by secondary emission in a plurality of stages within said atmosphere, and collecting the multiplied number of electrons as an inverse function of pressure.

2. In a method of measuring temperature, the steps comprising developing a stream of electrons through a vapor developed by a substance having a sensitive vapor pressure-to-temperature characteristic, multiplying the number of electrons of said stream in inverse relation to the pressure of said vapor by secondary emission in a plurality of stages within the vapor, and collecting the multiplied number of electrons as a function of temperature.

3. In a device for measuring pressure, the combination comprising an envelope, communicating means coupled between said envelope and a system to be measured for pressure, electron emissive means disposed within said envelope to develop a stream of electrons, collector means also disposed within said envelope to collect electrons, a plurality of secondary emissive electrodes disposed between said electron emissive means and said collector means for multiplying the number of electrons as an inverse function of the pressure to be measured, and means connected to said collector means for indicating electron flow as an inverse function of pressure.

4. In a device for measuring pressure, the combination comprising an envelope, communicating means coupled between said envelope and a system to be measured for pressure, an electron emissive cathode disposed within said envelope for emitting an electron stream therein, an anode also disposed within said envelope, a plurality of secondary emissive dynodes disposed between said cathode and anode, potential supply means connected to said cathode, anode, and dynodes to impress operating voltages for progressively multiplying the electron stream in transit from the cathode to the anode by the emission of secondary electrons from the dynodes in proportion to the number and energy of the electrons of the stream incident upon respective ones of the dynodes, the energy of electrons incident upon the dynodes and the number of secondary electrons emitted therefrom being inversely related to the pressure within the envelope and the system to be measured for pressure, and current measuring means connected to said anode and calibrated in units of inverse pressure.

5. In a device for measuring temperature, the combination comprising a sealed envelope, a substance having a sensitive vapor pressure-to-temperature characteristic enclosed within said envelope to develop a vapor pressure therein proportional to the temperature of the envelope, an electron emissive cathode disposed within said envelope, an anode also disposed within said envelope for emitting a stream of electrons thereto, a plurality of secondary emissive dynodes disposed between said cathode and anode, potential supply means connected to said cathode, anode, and dynodes to impress operating voltages for progressively multiplying said stream of electrons in transit from the cathode to the anode as an inverse function of said vapor pressure, and current measuring means connected to said anode and calibrated in units of temperature.

6. In an electron multiplier device, the combination comprising an envelope, an electron emissive electrode disposed within said envelope, an electron collector electrode disposed within said envelope, a plurality of secondary emissive electrodes disposed in said envelope between said emissive electrode and said collector electrode, potential means connected to said electrodes to provide a stream of a progressively multiplied quantity of electrons by the emission of secondary electrons from said secondary emissive electrodes in proportion to the number and energy of the electrons incident upon respective ones thereof, means for introducing particles in the region of said secondary emissive electrodes, the quantity of said particles responsive to a specific environmental physical condition, the energy of said electrons incident upon the secondary emissive electrodes and the number of secondary electrons emitted therefrom being inversely related to the quantity of said particles, and measuring means connected to said collector electrode to indicate the quantity of collected electrons of said stream as an inverse function of said physical condition.

References Cited in the file of this patent

UNITED STATES PATENTS

| | | |
|---|---|---|
| 1,697,339 | Baker | Jan. 1, 1929 |
| 2,457,530 | Coggeshall et al. | Dec. 28, 1948 |
| 2,490,468 | Picard | Dec. 6, 1949 |
| 2,537,775 | MacNille | Jan. 19, 1951 |
| 2,604,514 | Niel | July 22, 1952 |
| 2,696,739 | Enderes | Dec. 14, 1954 |
| 2,740,900 | Ruble | Apr. 3, 1956 |
| 2,777,326 | Schwieg | Jan. 15, 1957 |

FOREIGN PATENTS

| | | |
|---|---|---|
| 922,256 | Germany | Jan. 13, 1955 |